United States Patent
Freilino

[11] 3,731,092
[45] May 1, 1973

[54] NON-DISPERSIVE INFRARED GAS ANALYZER HAVING SAMPLE AND REFERENCE BEAMS USING FLOW SENSITIVE DETECTOR AND WITH UNBALANCED OPERATION

[75] Inventor: Ray S. Freilino, Pittsburgh, Pa.

[73] Assignee: Mine Safety Appliances Company, Pittsburgh, Pa.

[22] Filed: Nov. 11, 1971

[21] Appl. No.: 197,899

[52] U.S. Cl. ............................................. 250/43.5 R
[51] Int. Cl. ............................................. G01n 21/34
[58] Field of Search ............................... 250/43.5 R

[56] References Cited
UNITED STATES PATENTS

| | | | |
|---|---|---|---|
| 2,534,657 | 12/1950 | Bray | 250/43.5 |
| 2,648,775 | 8/1953 | Waters | 250/43.5 |
| 2,680,989 | 6/1954 | Savitzky et al. | 250/43.5 S |
| 3,560,736 | 2/1971 | Billetdeaux et al. | 250/43.5 |

*Primary Examiner*—William F. Lindquist
*Attorney*—Ronald H. Shakely

[57] ABSTRACT

Separate pulsed sample and reference beams of infrared energy are passed, respectively, through sample and reference gases to separate chambers in a detector unit for measuring the absorption of the sample beam by a component of interest in the sample gas. The detector unit includes a flow responsive sensor having a rate of change of resistance that varies inversely with temperature. By cyclically modulating the two beams, as, for example, by a shutter device that in one portion of a cycle cuts off the sample beam but not the reference beam and in another non-consecutive portion of the cycle cuts off the reference beam but not the sample beam and that separates such modulated portions by a cyclical portion in which the infrared energy in both beam paths is substantially equally modulated (including the conditions in which both beams are fully cut off or not cut off at all), one obtains the advantages of unbalanced operation inherent in a single beam instrument (i.e., increased sensitivity due to the non-linear response of the sensor), as well as the advantages of a double beam instrument (i.e., for example, compensation for changes in ambient conditions because of the use of a reference gas). This invention is an improvement of that disclosed in U.S. Pat. No. 3,560,736, issued to the assignee of the present application.

10 Claims, 12 Drawing Figures

Patented May 1, 1973
3,731,092
2 Sheets-Sheet 1
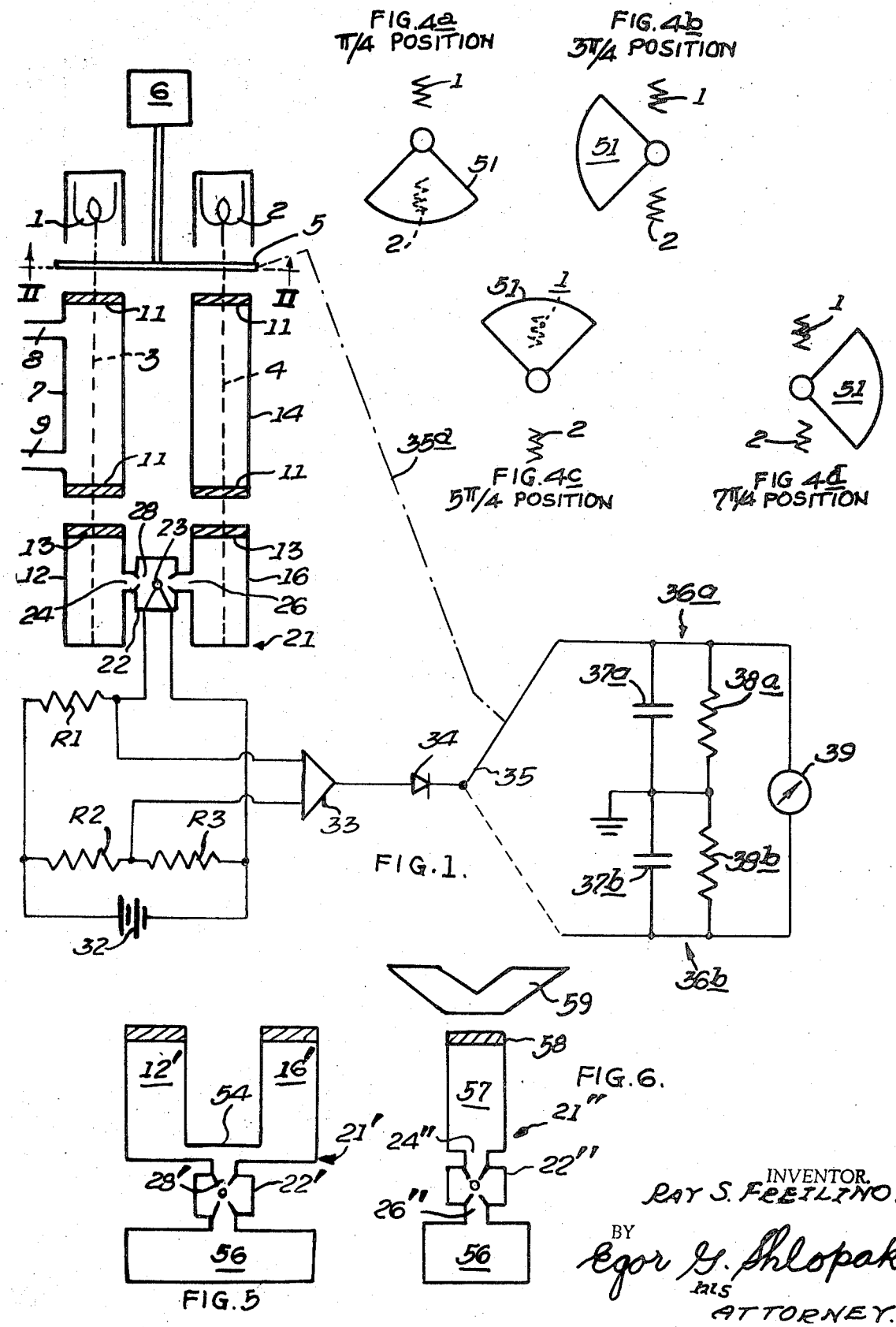

Patented May 1, 1973 3,731,092

π/4 POSITION

3π/4 POSITION

5π/4 POSITION

7π/4 POSITION

INVENTOR.
RAY S. FREILINO.
BY Egor G. Shlopak
his ATTORNEY.

NON-DISPERSIVE INFRARED GAS ANALYZER HAVING SAMPLE AND REFERENCE BEAMS USING FLOW SENSITIVE DETECTOR AND WITH UNBALANCED OPERATION

In the usual pulsed double beam infrared analyzer using a flow sensitive detector, one beam (the sample beam) passes through the gas sample to be analyzed and the other (the reference beam) passes through a reference gas. Each beam then enters a separate gas absorption chamber in a detector unit containing a gas that absorbs infrared energy. In such instruments, the two beams are pulsed by being modulated simultaneously and in the same way (as by a shutter device that periodically interrupts both beams). In addition, the beams are initially balanced, or substantially so, when they enter the detector unit, i.e., in the absence of a component of interest in the sample gas, the beams contain substantially equal amounts of infrared energy. If the sample gas contains a component of interest that absorbs such energy, the sample beam will be attenuated before it reaches the detector unit, and that attenuation can be measured, as, for example, by measuring the gas flow resulting from differential pressure pulses generated in the two chambers. In other words, in conventional double beam analyzers, the beams are (1) modulated equally and simultaneously and (2) initially balanced and then unbalanced by attenuation of the sample beam in response to the concentration of the component of interest in the sample. If the attenuation is slight, as it is with low absorptions by the component of interest, the differential pressure pulses between the chambers of the detector unit will be very small and may be offset by other losses in the system or by noise.

U.S. Pat No. 3,560,736, in contrast, provides for initial unbalance between the sample and reference beams, as by attenuation of the reference beam (while still modulating the beams equally and simultaneously), as both beams enter the detector unit in the absence of the component of interest in the sample gas. This initial unbalance is large enough to maintain an unbalanced condition even at maximum attenuation of the sample beam by absorption by the component of interest. Preferably, this initial unbalance is suppressed or compensated for in the measuring circuit. If the component of interest is present in the sample gas, the sample beam will be attenuated as it reaches the detector unit, but it will still be substantially stronger than the reference beam. Such unbalance permits taking advantage of the nonlinear response characteristics of a certain gas flow sensor mounted in a flow chamber between the two gas chambers of the detector unit to increase the sensitivity of the instrument. The greater the unbalance, the greater the increase in sensitivity, the maximum sensitivity occuring when the reference beam is entirely suppressed and the analyzer becomes a single beam analyzer.

The unbalanced operation described above is predicated on taking advantage of certain physical characteristics of a sensor, such as a thermistor, that has a nonlinear response to the cooling effect of gas flow over its surface. A thermistor is a thermally sensitive electrically resistive element having, in its usual form, a negative temperature coefficient of resistance, i.e., its resistance increases with a decrease in its temperature. Further, the rate of change of its resistance varies inversely with the temperature, i.e., the resistance increases at a faster rate for each change of unit temperature as the temperature decreases. These characteristics give to the thermistor a nonlinear response to gas flow that is highly favorable to the use of such an element as a sensor responsive to a decrease in temperature. If the thermistor is heated by an applied external voltage to a temperature above the ambient temperature and if a gas of lower temperature is flowed over the thermistor surface, the cooling effect of the gas will produce an increased electrical resistance in the thermistor and the rate of change of that resistance will, in turn, increase the lower the temperature to which the thermistor is cooled. If the velocity of the gas flowing over the surface of the thermistor is increased, there results a disproportionate increase in output signal or sensitivity, not only because of the change in gas velocity, per se, which produces a greater cooling effect (equally applicable to all electrically heated resistance sensors), but also because such greater cooling produces, in turn, an enhanced response in the thermistor due to its inherent nonlinear response characteristics. It will be apparent, in the context of the present invention, that the important feature of the thermistor (or any other electrically heated sensor that may be now, or become, available) is that its rate of change of resistance vary (directly or inversely) with temperature; i.e., that it have a nonlinear response. In other words, if the gas velocity is doubled the increase in response is more than doubled.

The flow responsive detector unit of U.S. Pat. No. 3,560,736 is provided with a pair of gas chambers at least one of which is adapted to be irradiated by a pulsed beam of infrared energy and to contain a gas absorbing such energy. A gas flow chamber is connected to each of the gas chambers by a separate passage that terminates at the flow chamber in a jet orifice. These orifices provide high velocity jet flow in the flow chamber in response to the alternate expansion and contraction of the gas in at least one of the gas chambers when subjected to pulsed infrared radiation. The cooling effect of such jet flow is enhanced by the entrainment (due to Venturi action) of cool gas in the flow chamber. In other words, the gas that is irradiated and contains a radiation absorbing component will alternately increase and decrease in temperature, thereby causing the gas to expand and contract and to flow from on chamber to the other. A thermistor sensor that is responsive to gas flow and that has a rate change of resistance that varies inversely with temperature is mounted in the flow chamber in the path of the jet flow from the orifices. The response of the sensor to the cooling effect of gas flow over it creates a fluctuating signal in a conventional electrical measuring circuit.

As previously stated, the above described analyzer of U.S. Pat. No. 3,560,736 is most sensitive when most unbalanced, i.e., when the reference beam is entirely suppressed and the analyzer becomes a single beam instrument. An instrument of the latter form does not, of course, have the advantageous symmetry of a balanced dual beam analyzer in automatically compensating for changes in ambient conditions.

It is accordingly a primary object of the present invention to provide an analyzer that combines the sensitivity of the unbalanced single beam instrument described above with the compensating features of the dual beam instrument by so modulating the dual beams that the instrument operates alternately as a single beam sample analyzer and a single beam reference analyzer, and by comparing the sample and reference infrared absorptions during such operations.

Further objects of the invention will be apparent from the following description of a preferred embodiment in connection with the attached drawings, in which FIG. 1 represents a diagrammatic view of a non-dispersive double beam infrared analyzer with shutter means for modulating those beams to provide maximum unbalanced operation;

FIGS. 4a – 4d are views, similar to FIGS. 2a – 2d, of an alternate form of shutter means for modulating the infrared beams in FIG. 1;

FIG. 5 is a partial diagram of the apparatus of FIG. 1, showing a modification of the absorption and flow chambers of the detector; and FIG. 6 is a partial diagram of the apparatus of FIG. 1, showing a further modification of the detector unit of FIG. 1.

Figure 2A:
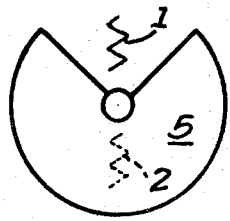
FIGS. 2a – 2d are partial sectional views (at reduced scale) along the line II-II of FIG. 1, showing the shutter means in plan in successive 90° positions of a rotational cycle relative to the infrared energy sources.
Figure 2B:
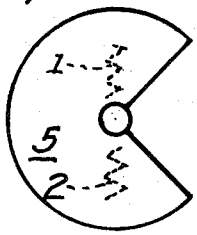
Figure 2C:
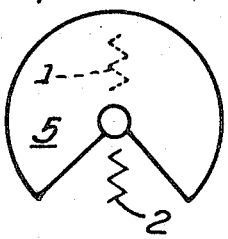
Figure 2D:
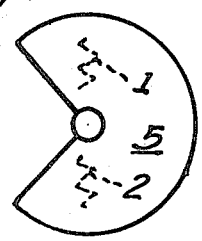

In FIG. 1, the analyzer is of the double beam non-dispersive type that includes a source of infrared radiation, shown here as two substantially identical, side-by-side sources 1 and 2, although it is obvious that they could be combined into a single source and then split, for transmitting radiation along two parallel beam paths. One of those beams, herein called the sample beam, is composed of rays from source 1 extending parallel to the optical axis 3 (shown in dashed lines). The other beam, herein called the reference beam, consists of rays from source 2 and extends parallel to the axis 4. The sample beam passes from source 1 through a chopper region, where the beam is periodically interrupted by a shutter device 5, in the form of an opaque disc (i.e., opaque to infrared energy in at least the wavelength of the band of interest characterizing the component of interest to be detected in the sample gas) with an open or transparent sector of about 90° (see FIG. 2), rotated by an electric motor 6. The resulting pulsed sample beam goes through a sample cell 7, which is provided with a gas inlet 8 and a gas outlet 9 and is otherwise sealed from the atmosphere by infrared-transparent windows 11 at each end. FInally, the sample beam enters a sample gas absorption chamber 12 through a window 13 similar to windows 11.

The reference beam follows a path parallel to the sample beam, passing from source 2 through the chopper region traversed by shutter 5, then through a reference cell 14 similar to the sample cell 7, except that the reference cell contains a fixed volume of reference gas, which is preferably of the same composition as the sample gas but without the particular component that is to be detected and measured. After leaving the reference cell, the reference beam enters a reference gas absorption chamber 16, which is identical with the sample gas chamber 12 previously described.

The gas chambers 12 and 16 constitute the gas absorption detector means of a gas flow detector unit 21. That unit additionally includes a flow chamber 22; a thermistor 23 mounted in the flow chamber; flow passages 24 and 26 connecting gas chambers 12 and 16, respectively, to the flow chamber; and jet orifices 28 forming the terminal portions of the passages 24 and 26. In the form of analyzer illustrated in FIG. 1, the gas flow detector unit means or unit, with its constituent chambers and passages, may be entirely filled with a mixture of (a) the gaseous component to be detected, or (b) a mixture of some other gas absorbing infrared energy in at least the wavelength band of interest and a non-absorbing diluent gas.

Referring generally to the operation of the analyzer illustrated in FIG. 1, the two beams of infrared energy are transmitted along the sample and reference paths through the sample and reference cells to the gas chambers of the detector unit. Before entering the sample and reference cell; the beams are modulated by the rotary chopper 5, such that in one portion of each cycle (see FIG. 2a) the reference beam is cut off while the sample beam is not, and in another non-consecutive portion of the cycle (see FIG. 2c) the sample beam is cut off while the reference beam is not, these non-consecutive portions being separated by an intervening cycle portion (see FIGS. 2b and 2d) in which both beams are cut off. As a result of such modulation, pulses of infrared energy at the chopping frequency pass alternately along each beam path, separated by intervals in which no infrared energy passes along either path. If the pulses reaching the detector unit 21 contain energy in those wave lengths that are absorbed by the gas in that unit, the gas therein will be heated and tend to expand and then contract in accordance with the gas laws. If each gas chamber 12 and 16 alternately receives the same amount of energy, the alternate gas expansions (and contractions) in each of those chambers will be equal and gas will flow alternately from one chamber to the other through passages 24 and 26 and flow chamber 22, the total flow in one direction being equal to that in the opposite direction. This condition will prevail, for example, when the sample cell 7 contains a sample gas that includes none of the component to be detected and the reference cell 14 contains a similar gas.

In contrast, when the gas in the sample cell (but not in the reference cell) contains a component of interest that absorbs infrared energy, the sample beam alone is attenuated before it reaches the detector unit. The gas in detector chamber 12 (in the optical path of the sample beam) will then receive and absorb substantially less infrared energy than will the gas in chamber 16 (in the optical path of the reference beam) a moment later. As a result, the gas in chamber 16 will expand (and contract) more than the gas in chamber 12, causing unequal alternate pulsing flow of gas through the flow chamber 22.

In each of the above cases, the pulsating flow through flow chamber 22 will cool the thermistor 23, and the cooling effect can be measured as a change in electrical resistance. As shown in FIG. 1, the thermistor forms one arm of an electrical bridge circuit that also includes fixed resistances R1, R2 and R3 in the other arms. A battery 32 supplies current to the bridge. The pulsed output of the bridge is amplified in an A-C amplifier 33 and then rectified in a rectifier 34. A switch 35 (operated in synchronism with the shutter 5, by conventional means shown only diagrammatically by the dashed line 35a) alternately directs the rectified signal to each of two similar filter circuits 36a and 36b. The rectified signal resulting from sample beam absorption is switched to the "sample" section 36a of the filter network, and the signal resulting from reference beam absorption is switched to the "reference" section 36b of the filter. Each filter section includes a capacitor (37a and 37b) and a resistor (38a or 38b) connected in parallel. The resulting D-C output of each filter section is delivered to a suitable conventional meter 39, where the signals are integrated and their difference read out on the meter.

Figure 3:
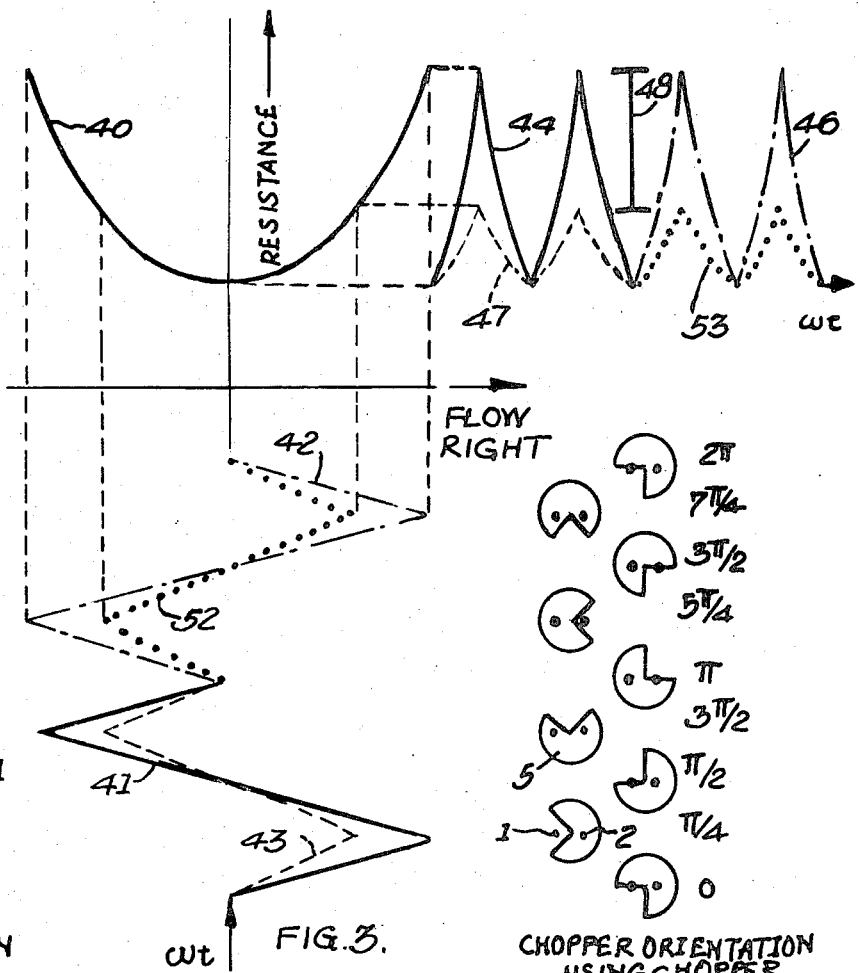
FIG. 3 is a diagram showing the flow transfer characteristic of the sensor in response to gas flow (input signal) produced by pulsed radiation in the presence and in the absence of absorption by a component of interest in the gas to be analyzed and the resulting change in resistance of the sensor (output signal) in the operation of the double beam analyzer of this invention.

FIG. 3 illustrates in more detail the response characteristics of the thermistor in the operation of the device just described. In the upper left portion of this figure, a curve 40, having symmetry about the ordinate, was constructed assuming a parabolic ($y = a + bx^2$) relationship for the non-linear response characteristics of the thermistor 23 (i.e., increasing positive slope with increase in gas flow). The ordinate represents thermistor resistance or, with the appropriate circuit, thermistor voltage. The abscissa represents gas flow between the gas absorption chambers 12 and 16 of the detection unit.

The lower portion of FIG. 3 shows the sample and reference flow waveforms, both in the absence and in the presence of an absorbing component of interest in the sample gas, during a complete cycle of the chopper. The solid line 41 represents the sample flow waveform, in the absence of the component of interest, during the first half cycle of the chopper of the form shown in FIG. 2. It starts with the chopper at zero degrees and just about to uncover the sample beam for irradiation of the sample gas. (See the correlated chopper orientations on the right hand margin of the diagram in which, for convenience, the infrared energy source is shown as a point.) When the sample beam is exposed, the resulting increase in temperature and pressure in the sample gas absorption chamber 12 produces a flow out of that chamber into the reference gas chamber 16, which rises to a maximum when the chopper is approximately in the $\pi/4$ position and ceases when the pressure builds up sufficiently in the reference chamber at approximately the $\pi/2$ position of the chopper. The radiation to both chambers is cut off by the chopper between the $\pi/2$ and $\pi$ positions; and, during this interval, gas flows back from the second (reference) chamber 16 to the first (sample) chamber 12 as the gas in the first chamber cools. Assuming that the chopping frequency allows sufficient time for temperature equilibrium to be reached, then the first one half cycle (i.e., between the zero and $\pi$ positions of the chopper, the total gas flow in one direction will be equal to the total flow in the other direction, and they will have similar waveforms.

In the second half cycle ($\pi$ to $2\pi$), the reference beam initiates the gas flow in the absorption chambers, since that beam alone enters the detector unit during any part of that cycle. The resulting reference flow waveform is shown by the broken line 42 in FIG. 3. It will be noted that the expansion and contraction gas flows, in this second half cycle are, respectively, in the opposite directions from those in the first half cycle, but equal in magnitude and form (assuming the two beams are of equal strength and that there is equal or no absorption of infrared energy in the sample and reference cells). In other words, when integrated over an entire cycle, the "sample" gas flows through the flow chamber 22 during one half of the cycle equals the "reference" gas flows in the other half of the cycle.

In contrast to the foregoing, when a component of interest is present in the sample cell, there will be attenuation in the sample beam before it reaches absorption chamber 12, so that in the first half cycle (0 to $\pi$) there will be less heating of the gas in that chamber, therefore less expansion (and contraction) of gas therein and less gas flow through flow chamber 22. This condition is shown in FIG. 3 by the dashed line 43, representing the smaller magnitude of the sample gas flow during the sample half cycle (0 to $\pi$) when the component of interest is present in the sample cell. Since the reference gas remains unchanged in the reference cell, the gas flow through chamber 22 during the reference half cycle ($\pi$ to $2\pi$) is represented, as before, by the broken line 42.

In each of the waveforms described above, a triangular wave form is indicated for convenience. If values are transferred point by point from the abscissa, or flow axis, to the ordinate, or signal axis, using the transfer characteristic of the curve 40, the output signal may be derived by the integration of the sample and reference signals over one or more cycles of operation. As shown in the upper right portion of FIG. 3, the solid line 44 represents the "component absent sample absorption" signal, i.e., the signal produced by the sample beam over each first half cycle in the absence of the component of interest in the sample gas; and the broken line 46 represents the "reference absorption" signal, i.e., the signal produced by the reference beam over each second half cycle. These signals are of equal magnitude; and, when integrated over one or more cycles, their difference is zero, indicating the absence of the component of interest in the sample gas. The dashed line 47 represents the "component present absorption" signal, i.e., the signal produced by the sample beam over each first half cycle when a component of interest (in a certain concentration) is present in the sample gas. The "reference absorption" signal 46 remains, of course, the same whether a component of interest is or is not present in the sample gas. Accordingly, when a component of interest is present, the net output signal integrated over one or more cycles is the difference between the broken line 46 and the dashed line 47, shown by the bar 48. Such integration is performed by the electrical circuit of FIG. 1.

An alternate form of rotatable chopper 51 is shown in FIGS. 4a – 4d, in the form of an opaque sector (i.e., opaque to infrared energy in at least the wavelength band of interest) extending through an arc of 90°. This chopper, in one portion of its rotational cycle (see FIG.

4a), cuts off the reference beam but not the sample beam, and in another non-consecutive portion of its cycle (see FIG. 4c), cuts off the sample beam but not the reference beam. (These portions of its cycle are similar to those shown for chopper 5 in FIGS. 2a and 2c, respectively.) These non-consecutive cycle portions (FIGS. 4a and 4c) are separated by intervening portions (FIGS. 4b and 4d) in which neither beam is cut off. (Compare this situation with that of chopper 5 where, in the intervening cycle portions, FIGS. 2b and 2d, both beams are cut off.) It will be apparent, however, that choppers 5 and 51 produce equivalent though not identical results, since each provides alternate single beam operation in non-consecutive cycle portions in which sample and reference beams are modulated simultaneously and in the same way (i.e., either or both beams are cut off or neither is cut off.)

As might be expected from the foregoing description, the response characteristics of thermistor 23 are also similar whether the analyzer is operated with chopper 5 or chopper 51. This assertion may be demonstrated in FIG. 3, previously discussed in some detail in connection with chopper 5. On the left hand margin of that diagram are shown successive orientations of chopper 51 corresponding to those of chopper 5 on the right hand margin to produce a similar waveform in the absence of the component of interest in the sample gas. Beginning at zero degrees, when chopper 51 (turning clockwise) cuts off the reference beam while the sample beam remains fully exposed, the gas in reference absorption chamber 16 cools and contracts, so that gas flows into that chamber out of sample absorption chamber 12, the flow rising to a maximum when the chopper is approximately in the $\pi/4$ position and ceasing when the pressure drops sufficiently in the sample chamber 12 at approximately the $\pi/2$ position. When both chambers 12 and 16 are exposed to radiation between the $\pi/2$ and $\pi$ positions during the second quarter cycle, gas flows back from reference chamber 16 to sample chamber 12 as gas in the former is reheated by infrared absorption. Accordingly, the solid line 41 in FIG. 3 represents the direction and approximate magnitude of the gas flow during the first half cycle operation with chopper 51, just as it did for chopper 5. It will be noted in the first half cycle that the magnitude of the gas flow is controlled by the expansion and contraction of gas in reference absorption chamber 16 and is therefore invariant with respect to the presence or absence of the component of interest in the sample gas.

During the second half cycle ($\pi$ to $2\pi$), the gas flow waveform is represented by the broken line 42, provided there is no component of interest in the sample cell. During the third quarter of the cycle ($\pi$ to $3\pi/2$), where the chopper cuts off radiation to the sample cell but leaves the reference cell fully exposed, the gas flow is controlled by the contraction of gas in the sample absorption chamber 12, so that maximum flow (in the absence of the component of interest) is to the left in the diagram and equal in magnitude to the "reference" flow 41 in the same direction. In the last quarter of the cycle ($3\pi/2$ to $2\pi$), the flow is controlled by the reheating of gas in the sample absorption chamber 12 and is in the opposite direction but of the same magnitude in the absence of the component of interest in the sample gas. In contrast, when that component is present, the waveform during the last half cycle ($\pi$ to $2\pi$) is shown by the dotted line 52, which is similar in magnitude (for the same concentration of the component of interest) as dashed line 43 but in the opposite direction and axially displaced by 180°. It will be noted, however, that the integrated signal output of the chopper 51 is still represented (for the same concentration of the component of interest) by the bar 48, the difference between the solid line 44 and the dotted line 53, the latter representing the signal output of waveform 52.

It will be apparent that other forms of chopper elements, including reciprocating shutters, could be used to obtain the same or equivalent waveform and signals. It will also be apparent that the opaque portions of the shutter need be opaque only to the wavelength band of interest and may be opaque or transparent, selectively, to other wavelengths.

In FIG. 5 is shown a modification of the detector unit of FIG. 1. Instead of having the gas flow chamber 22 between the two gas absorption chambers 12 and 16, the modified flow chamber 22' is between (a) the gas absorption chambers 12' and 16', which are connected by the passage 54, and (b) a back chamber 56. In this case, the chambers 12', 16', and 56 (as well as passage 54) constitute the gas absorption detector means. The flow chamber is provided, as before, with jet orifices 28'. Absorption of infrared energy in either of the chambers 12' or 16' and consequent expansion of gas in that chamber will create gas flow through the flow chamber 22' into back chamber 56 (and into the other absorption chamber as well). When flow in that direction ceases, and the chamber where the absorption occurred cools, there will be flow in the opposite direction. This is similar to the to and fro gas flow previously described in connection with FIG. 1 between the absorption chambers 12 and 16, and results in a similar signal output for the detector unit 21'. It is desirable that the flow resistance of passage 54 be substantially less than that of the flow chamber 22' to permit rapid equalization of pressures in the two absorption chambers. In fact, as shown in FIG. 6, chambers 12' and 16' can be combined into a single gas absorption chamber 57, provided with a single window 58 for receiving, through a conventional beam combiner 59, the sample and reference beams leaving the sample and reference cells 7 and 14, respectively. The flow chamber 22'' is then connected by passages 24'' and 26'' and the usual jet orifices between chamber 57 and back chamber 56, the latter two chambers constituting the gas absorption detector means. It will be apparent that each of the detector units 21, 21' and 21'' in FIGS. 1, 5, and 6 is the equivalent of the others in theory and function.

If desired, the chopper means 5 or 51 can be disposed in the optical paths of the sample and reference beams leaving the sample and reference cells before those beams reach the detector unit.

I claim:

1. In an infrared analyzer of the type in which the component of interest in a gas sample is selectively detected and measured by its absorption of a pulsed beam of infrared energy emitted by a source of such energy along two beam paths, one a sample beam and the other a reference beam, and in which a sample cell is disposed in the path of the sample beam and adapted to hold the gas sample to be analyzed, and in which a reference cell is disposed in the path of the reference beam and adapted to hold a reference gas, the improvement comprising: means for cyclically modulating the infrared energy in both beam paths such that in one portion of each cycle the infrared energy in at least the wavelength band of interest in the sample path is interrupted while that in the reference path is not interrupted and in another but non-consecutive portion of each cycle the infrared energy in at least the wavelength band of interest in the sample path is not interrupted while that in the reference path is interrupted, said non-consecutive portions being separated in the same and consecutive cycles by an intervening cycle portion in which the infrared energy in at least the wavelength band of interest in each path is modulated simultaneously in the same way including the condition in which said bands in both beams are simultaneously interrupted, and the condition in which said band in neither beam is interrupted, gas absorption detector means disposed in the optical paths of the sample and reference beams leaving the sample and reference cells, respectively, and adapted to contain a gas absorbing infrared energy in the same spectral region as the component of interest for irradiation by said beams, a gas flow chamber connected to the detector means to provide relatively high velocity gas flow into and out of the flow chamber in response to the alternate expansion and contraction of gas in the detector means when at least a portion of said means is subjected to said pulsed infrared energy, an electrically heated resistance sensor responsive to cooling by gas flow and having a rate of change of resistance that varies with temperature, the sensor being mounted in the flow chamber in the path of said high velocity gas flow, the cooling effect of which is enhanced by the entrainment of cool gas in the flow chamber; and circuit means for electrically monitoring and temporarily storing in separate channels the changes in resistance of the sensor in response to gas flow resulting from the absorption of infrared energy by the sample gas, both in the presence and in the absence of the component of interest in the sample gas, on the one hand and by the reference gas on the other hand, and means for integrating such monitored responses and for displaying their difference as a measure of the concentration of the component of interest in the sample gas.

2. Apparatus according to claim 1, in which the cyclically modulating means includes a rotatable shutter in the form of a disc opaque to infrared energy in at least the wavelength band of interest and having a sector of about 90° therein that is transparent to the wavelength band of interest.

3. Apparatus according to claim 1, in which the cyclically modulating means includes a rotatable shutter in the form of a sector of about 90° opaque to infrared energy in at least the wavelength band of interest.

4. Apparatus according to claim 1, in which said cyclical non-consecutive portions are separated by an intervening cyclical portion in which the infrared energy in at least the wavelength band of interest in both beams is completely interrupted.

5. Apparatus according to claim 1, in which said cyclical non-consecutive portions are separated by an intervening cyclical portion in which the infrared energy in at least the wavelength band of interest in each beam is equal and uninterrupted.

6. Apparatus according to claim 1, in which the gas absorption detector means include a first gas absorption chamber in the optical path of the sample beam leaving the sample cell and a second gas absorption chamber in the optical path of the reference beam leaving the reference cell.

7. Apparatus according to claim 6, in which said flow chamber is connected between the two gas chambers.

8. Apparatus according to claim 6, in which the gas absorption detector means also include a back chamber, and in which the two gas absorption chambers are interconnected and in which the flow chamber is connected between the back chamber on the one hand and the gas chambers on the other hand.

9. Apparatus according to claim 1, in which the gas absorption detector means includes a gas absorption chamber and a back chamber, the gas absorption chamber being in the optical paths of both the sample and reference beams leaving the sample and reference cells, respectively, and in which the gas flow chamber is connected between the gas absorption chamber and the back chamber.

10. Apparatus according to claim 1, in which the sensor has a rate of change of resistance that varies inversely with temperature.

* * * * *